United States Patent [19]

Schönhuber

[11] 4,394,567
[45] Jul. 19, 1983

[54] DATA RECORDING SYSTEM

[76] Inventor: Max J. Schönhuber, Seefeldquai 1, CH 8008 Zürich, Switzerland

[21] Appl. No.: 127,117

[22] Filed: Mar. 4, 1980

[30] Foreign Application Priority Data

Mar. 6, 1979 [CH] Switzerland .......................... 2150/79

[51] Int. Cl.³ .......................... G01F 1/00; G06K 5/00
[52] U.S. Cl. .......................... 235/375; 73/861.77; 340/870.01
[58] Field of Search .......................... 340/150, 870.01; 346/33 M; 360/5, 6; 73/861.77; 364/510; 235/375

[56] References Cited

U.S. PATENT DOCUMENTS 3,961,527 6/1976 Sonnberg .......................... 346/33 M

*Primary Examiner*—Harold I. Pitts
*Attorney, Agent, or Firm*—Fishman and Van Kirk

[57] ABSTRACT

A system for recording data is disclosed, which relate to lots to be collected, particularly to milk lots to be delivered to a central collecting station. A recorder installed on the collecting vehicle comprises the normally existing data memory and closely adjacent thereto a second memory, which has preferably the same structure and serves to store those data which are required in an analytical laboratory for an analysis of samples taken from the lots as they were collected. These data are recorded in the second memory under the control of a selector. By means of the second memory, a separate data carrier is provided, which is delivered to the analytical laboratory, in which data representing the result of the various analyses are recorded on said data carrier so as to supplement the data originally recorded thereon. In this way the data can be fully automatically collected and processed, uniform technology can be used in the system required for this purpose and, as a result, the equipment used on the collecting vehicle and in the analytical laboratory can be simplified and the overall functional reliability can be improved.

13 Claims, 2 Drawing Figures

DATA RECORDING SYSTEM

FIELD OF THE INVENTION

This invention relates to a system for recording data which relate to specific lots of materials, particularly to milk lots, which are collected at delivery locations by a collecting vehicle and are brought by the latter to a collecting station. This novel system comprises a recorder, which is provided in the collecting vehicle and includes data input means, a control unit and a memory. The memory is connected to the control unit and contains a data storage medium which can be removed from the recorder and inserted into a data-evaluating device which is located at the collecting station or at an evaluating or electronic data-processing center associated with a plurality of collecting stations. The apparatus at the data processing center reads, processes and evaluates the recorded data.

The fields of application of such recording systems include, for instance, the collection of homework products, the collection of agricultural products, such as grain, fruit juice, sirup and the like, the collection of forest products, and the like. As indicated above, the preferred field of application is the collection of milk lots which have been produced in a number of scattered farms and are collected by a vehicle, which carries the milk lots to a collecting station or dairy. It is pointed out at this juncture that the advantages of the present invention become particularly clearly apparent in this specific application relating to the collection of milk lots.

DISCUSSION OF PRIOR ART

Existing recording systems used in connection with the collection of milk lots include recorders, which are installed in the milk-collecting vehicle and use a data carrier, e.g., a magnetic tape cassette or a metal tape cassette, for recording the data which become available during the collecting operation. The data are delivered by input devices, by which certain constant or discrete data, such as the vehicle number, driver's number, number of central collecting station, date, time of beginning of trip etc. can be written onto the data carrier, e.g., by means of a keyboard or encoding switches and which comprise a number of signal generators. Prior systems also include sensors for providing input signals which represent data that are characteristic of each supplier, such as a quantity of liquid and measured values which relate to certain properties of the liquid and are measured during the collecting trip rather than in an analytical laboratory, such as temperature, pH value, etc. A supplier's number can be entered by means of the keyboard or by manually or automatically actuated encoding switches. An identity card reader or an inductive container mark reader may also be provided. The data input means are connected to the memory by a control unit, which causes the data to be stored in the desired sequence and may include auxiliary memories for the temporary storage of data which come from the data input devices and are to be delivered to the memory including the removable data carrier.

During the collection of lots of materials by a collecting vehicle in which the lots are mingled or mixed, a just evaluation of the several suppliers regarding the lots supplied by them will not be possible unless the individual lots are analyzed at least from time to time. This must be effected in addition to the measurements which are regularly taken during each collecting trip, for instance daily. When lots of milk are collected by a milk-collecting vehicle this requirement is met in that sample containers corresponding in number to the milk suppliers are carried along by the collecting vehicle for a collecting trip at certain intervals of time, for instance, once a week, and are filled with samples taken from the respective lots. To ensure that the sample containers are properly associated with respective suppliers, the sample containers are fixed in frames or on stands and the samples are filled into the sample containers in the sequence in which the samples are arranged in their mounting. This sequence corresponds to the sequence in which the lots are collected. It is also known that additional data which are required for the analytical laboratory can be manually recorded by an operator or by the driver of the milk-collecting vehicle and can be delivered together with the filled sample containers to the analytical laboratory. The manual recording has proved to be undesirable because it is time-consuming and may lead to errors.

It has also been attempted to render the recording of the data required by the analytical laboratory independent of the original recording of the data for the central collecting station and for this purpose to provide a magnetic tape track on the sample bottles, which are accommodated in special magazines, e.g., drumlike magazines. A special writing device was used to record on said magnetic tape track the data which are desired by the analytical laboratory.

Such system affords the advantage that the proper association of the sample bottles with the individual suppliers no longer depends on a fixed sequence of the sample bottles in a holder. On the other hand, that system has the disadvantage that the specifically designed means for the automatic recording on the several sample bottles are rather complicated and susceptible to being disturbed by environmental conditions. For this reason the entire arrangement ought to be installed in the driver's cab of the collecting vehicle. But this is not possible in practice. Further specifically designed means for automatically reading the data recorded on the sample bottles are required at the analytical laboratory. Additionally, the storage capacity of a record-carrying track on a sample container used in the known system is necessarily restricted and the data can be recorded only at relatively low speed. Finally, the mechanism for driving and moving the sample containers for instance, in disklike or drumlike magazines, are rather complicated and each sample bottle must be rotated on its axis for the recording and reading of the data. Also, the transmission of data during the recording on the recording tape on the sample bottle and during the reading of said tape may be disturbed when the sample bottle is not perfectly round, as may be the case with plastic containers.

SUMMARY OF THE INVENTION

It is an object of the invention so to design a system of the kind described wherein, after the collection of the lots, the data required for an analysis of samples taken from the lots can be obtained by a technique and associated apparatus which may be implemented with moderate expenditure on the collecting vehicle and at the analytical laboratory, the apparatus and techniques provided on the collecting being particularly reliable.

The foregoing objects are accomplished according to the invention by providing the data recording means on the collecting vehicle with a second memory. This second memory is connected to the control unit and contains a second data carrier which can be removed from the recorder. The control unit includes a selector by which the data coming from the data input devices can be selectively delivered to the two memories.

At least some of the data can be delivered by the selector either to the first-mentioned memory or to the second memory. In the preferred arrangement, at least some of the data are delivered by the selector only to the first-mentioned memory, some only to the second memory and some data is delivered to both memories.

A preferably automatic selector may be provided, which is adapted to be enabled and disabled in dependence on a predetermined condition of the collecting vehicle. For instance, the selector can be enabled when a magazine which contains sample vessels and cooperates with a sample-taking device has been inserted into a holder.

The signals delivered by the data input devices are preferably converted to digital signals or, in order to save costs, consist of simple yes-no signals which indicate the compliance or non-compliance with a prescribed limit, e.g., of temperature or pH value, and contain signal portions which characterize their origin and to which the selector is responsive so that a first signal causes the associated data to be stored only in the first-mentioned memory, a second signal causes the associated data to be stored only in the second memory, and a third signal causes the associated data to be stored in both memories.

It is apparent that, in the system proposed, the data of interest to the analytical laboratory can be recorded at a protected location in the driver's cab because the recording equipment on the collecting vehicle has been provided with additional means, which are by no means expensive. The memories used for this recording may be alike in physical activity or may even be identical to be memories which are used for the original recording of data for the central collecting station. In the analytical laboratory, the data recorded on the data carriers may be supplemented by the data representing the results of the analyses. This can be accomplished by recording means which are identical to those used in the recorder on the collecting vehicle. As a result, one and the same data carrier can be provided in the second memory of the recorder of the milk-collecting vehicle with recorded data representing, e.g., the suppliers' numbers and can be provided in the analyzer of the analytical laboratory with recorded data which represent the associated results of analyses. For this reason it is sufficient to furnish the analytical laboratory with the filled sample containers and with the data carrier on which the preliminary data have been recorded, rather than with the previously employed manual records, and this data carrier can be inserted in the analytical laboratory into the similar data recorder. As a result, the technical components and means are simplified and the reliability is increased and the economical expenditure is simplified too as well as the spare parts requirements and the repairs.

An additional check regarding the association of the supplier and the sample container can be effected by a rugged marking device, which is unsusceptible to being disturbed and provides the plastic containers for the samples or the closures of said containers with marks for indicating the sequence in which the samples have been taken. Certain data signals indicating the sequence in which the samples have been taken may be recorded on the data carrier of the second memory. When the relatively coarse marks on the sample containers are used also for the control of the recorder at the analytical laboratory, the series of analyses can be performed independently of a predetermined sequence of the sample containers in a holder and without a restriction regarding the data to be taken into account for each sample.

Additional desirable features of the system proposed here are recited in the accompanying claims, the contents of which is hereby incorporated in the specification although the wording is not repeated.

BRIEF DESCRIPTION OF THE DRAWINGS

An illustrative embodiment of the invention will now be explained with reference to be accompanying drawing in which.

DESCRIPTION OF A PREFERRED EMBODIMENT

Figure 1:
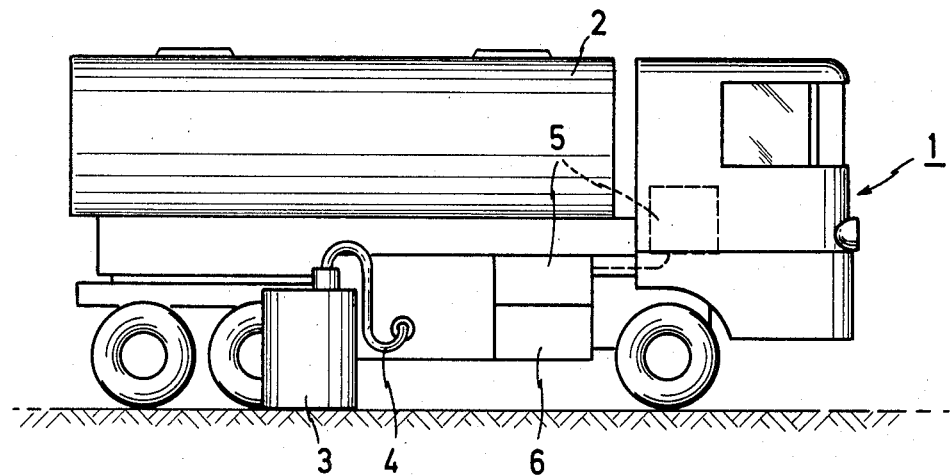
FIG. 1 is a diagrammatic view showing a milk-collecting vehicle as it receives a lot of milk.

A milk-collecting vehicle 1 shown in FIG. 1 comprises a tank 2, in which lots of milk are received from milk containers 3 which have been deposited and filled in several farms. The milk containers 3 are connected to the collecting vehicle 1 through a conduit 4, which is only diagrammatically indicated in FIG. 1, and by pumping means. A symbolically indicated recorder 5 is provided on the milk-collecting vehicle and serves to record data relating to the several lots of milk. Except for accessories, the main part of the recorder 5 is disposed at a protected location in the driver's cab of the collecting vehicle. The collecting vehicle is also provided with a sample-taking device 6. It is pointed out that the locations of the previously described parts of the equipment on the collecting vehicle 1 are only diagrammatically indicated and that entirely different locations may be selected.

Figure 2:
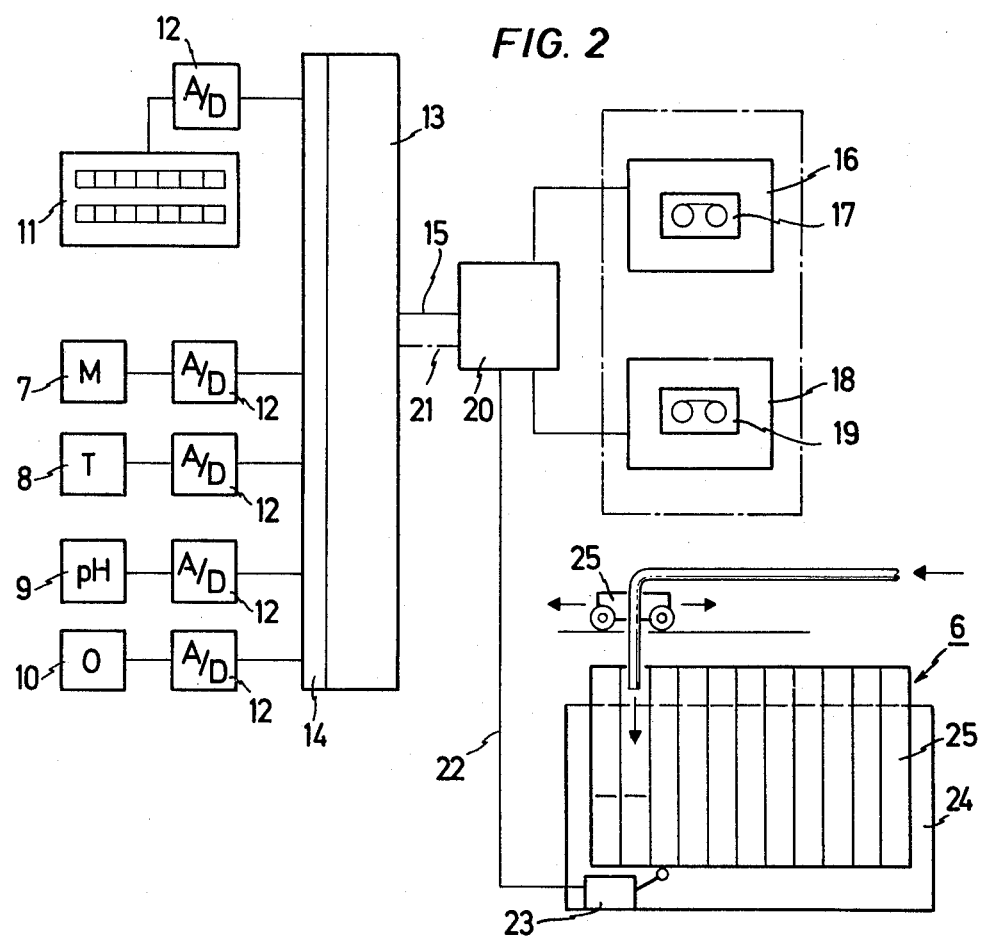
FIG. 2 is a block circuit diagram showing the recorder of the milk-collecting vehicle of FIG. 1.

Referring to FIG. 2, recorder 5 is provided with a peripheral supplement or an accessory including a number of sensors and transducers, such as the sensors and transducers 7 to 10, for generating signals which represent the quantity M of the lot, the temperature T, the pH value or another physical value. These sensors and transducers are mainly located outside the driver's cab. In addition to the input devices consisting of the sensors and transducers 7 to 10 there is an input or encoding device 11, which provides input signals that have previously been entered by a keyboard and stored. These inputs represent a vehicle number, a driver's identification number, a date, and a number of a central collecting station. Data signals indicating a supplier's number and, if desired, additional data signals relating to the supplier may also be delivered by the input device 11 automatically or under manual control or under the control of identifying marks provided on the milk container 3.

The output signals of the input devices 7 to 10 or 11 are converted into digital signals by analog-to-digital converters 12 or are inherenlty presented as digital signals or, in order to save costs, as simple yes-no signals indicating the compliance or non-compliance with a prescribed limit. e.g., of temperature or pH value, and are then delivered to a control unit 13, which includes a register group 14 for the temporary storage of the data signals from the input devices. The control circuit of the control unit 13 addresses the registers of the register group 14 in a predetermined sequence and sequentially delivers the contents of the registers via an output lead (data bus) 15 to a first memory 16 of the recorder of the milk-collecting vehicle. The memory 16 includes a write head, which is not shown on the drawing, and a data storage medium carrier 17 containing of a magnetic tape cassette or metal tape cassette.

The control unit 13 and the memory 16 are arranged in that part of the recorder which is located in the driver's cab of the milk-collecting vehicle.

A second memory 18 is provided, which is disposed close to the memory 16 and in the embodiment shown in FIG. 2 is contained in the same housing as the memory 16. In the disclosed embodiment the memory 18 is identical to memory 16. It is common to both memories that each of them includes a data carrier, which can easily be removed from the recorder. Data which have been recorded on the data carrier can thus be evaluated in a reader, which is remote from the recorder. The data carrier of memory 18 is designated 19 in FIG. 2. It is pointed out at this juncture that the second memory may alternatively contain a data carrier which is separate from the data carrier 17 and can be independently removed and is adapted to have data recorded thereon by recording means which are used also for recording on the data carrier 17 and which are selectively operatively associated with one data carrier or the other.

The memories 16 and 18 are coupled to the output lead 15 of the control unit 13 by a selector 20, which decides whether a data signal appearing on lead 15 is stored in memory 16 or in memory 18 or in both memories. For this purpose the input devices together with any associated analog-to-digital converters may be so designed that their output signals include the actual data as well as an address to which the selector 20 is responsive. In that case the signal delivered by a given input device will inherently determine in which of the memories 16 and/or 18 the data are to be stored. The selector 20 may alternatively be controlled in that the change over from the memory 16 to the memory 18 and vice versa is effected in dependence on the predetermined sequence in which the data input devices are addressed. For this purpose the selector 20 may be responsive to the order number of the data signal to be stored.

The selector 20 may be enabled and disabled by a switching signal, which is generated by a state sensor 23 of the sample-taking device 6 and delivered via a control lead 22. A magazine is inserted in a holder 24 of the sample-taking device 6 and contains sample containers 25 in a fixed sequence. The sample containers are filled by means of a sample-filling device, which is diagrammatically indicated at 25 in FIG. 2, such as a sampling needle or injection needle. As the milk-collecting vehicle moves to successive suppliers, the sample-filling device or the stands carrying the sample containers are advanced step by step so that there is a definite association between the several sample containers and the suppliers.

When all milk lots from all suppliers have been collected, the collected lots are delivered from the tank 2 at the central collecting station or the dairy and the data carrier 17 of the memory 16 together with records for accounting and bookkeeping is delivered to electronic data-processing equipment including a suitable reader. The magazine 25 of the sample-taking device 6 with the sample containers included therein, as well as the data carrier 19 from memory 18, are delivered to an analytical laboratory. In the latter, the contents of each sample container is analyzed so that those data are ascertained for each milk lot which have not been obtained by measurements taken as the lot was collected. The results of the analyses are recorded on the data carrier 19 in addition to the data which have previously been recorded thereon, for example the supplier's number. This may be accomplished by recording means which agree with those in the recorder. The data carrier is then forwarded to the central collecting or evaluating station or the data recorded thereon are communicated to a remote processing station or subjected to teleprocessing.

The magnetic tape memories or metal tape memories indicated in FIG. 2 may be replaced by magnetic wire memories, flexible magnetic disc or magnetic memories, semiconductor memories or magnetic bubble memories.

The control unit 13 and the selector 20 may include a hardware-implemented control logic or may comprise solid-state memories which can be programmed as desired to provide a programmable control logic.

What I claim is:

1. Apparatus for recording data commensurate with a plurality of serially collected samples of material comprising:
    means providing a plurality of input signals commensurate with sensed parameters of each sample of material;
    means providing input signals commensurate with the identity of each sample of material;
    data recording means, said recording means including:
        a first storage device, said storage device comprising a removable data storage medium and means for recording data on said medium; and
        a second data storage device, said second storage device including a removable data storage medium and means for recording data on said medium; and control means interconnecting said input signal providing
    means and said recording means, said control means selectively delivering data bearing signals to said first and second storage devices for recording on said mediums whereby information commensurate with sensed material parameters and the identity of the sample corresponding to those sensed parameters will be selectively stored on the first or second or both said first and second storage mediums.

2. The apparatus of claim 1 wherein said apparatus is mounted on a vehicle and the collected material is an agricultural product, the serially collected samples of the material being comingled in the vehicle.

3. The apparatus of claim 1 wherein said control means comprises:
    register means for temporarily storing information corresponding to the input signals commensurate with sensed parameters and sample identity;
    means for serially and selectively delivering signals commensurate with the stored information to said recording means storage devices; and
    means for providing control signals to said delivering means, said control signals determining the routing of said information signals to said storage devices.

4. The apparatus of claim 2 wherein said control means comprises:

register means for temporarily storing information corresponding to the input signals commensurate with sensed parameters and sample identity;

means for serially and selectively delivering signals commensurate with the stored information to said recording means storage devices; and means for providing control signals to said delivering means, said control signals determining the routing of said information signals to said storage devices.

5. The apparatus of claim 1 further comprising:

means responsive to a condition of the collection of the material for generating an input control signal for said control means, said control means being responsive to said input control signal for determining the medium on which the data commensurate with the individual input signals is stored.

6. The apparatus of claim 4 wherein said control signal providing means comprises:

means responsive to a condition of the collection of the material for generating an input control signal for said control means, said delivering means being responsive to said input control signal for determining the medium on which the data commensurate with the individual input signals is stored.

7. The apparatus of claims 3, 4 and 6 further comprising:

analog to digital converter means connected between said means providing input signals commensurate with sensed parameters and said register means.

8. The apparatus of claims 1, 3, 4, 5 and 6 wherein said first and second storage devices are mounted in a common housing.

9. The apparatus of claim 7 wherein said first and second storage devices are mounted in a common housing.

10. The apparatus of claims 1, 3, 4, 5 and 6 wherein said storage medium of said first and second storage devices each comprises a magnetic tape.

11. The apparatus of claim 9 wherein the agricultural product comprises milk and wherein a device for collecting a specimen of each serially collected sample is mounted on the vehicle and said condition responsive input control signal generating means is responsive to the state of said specimen collecting means.

12. In a method for the collection and processing of data commensurate with serially collected lots of an agricultural product, the lots being comingled, the improvement comprising the steps of:

sensing a plurality of parameters commensurate with each serially collected lot;

selectively recording the sensed parameters and the identity of the corresponding lot on first and second portable recording media, at least some of the information being recorded on the first recording medium and at least some of the information being stored on both recording media, regions devoid of stored information being provided on the second recording medium;

sampling, storing and identifying small quantity specimens corresponding to each of the collected lots;

analyzing the specimens and recoridng data commensurate with the results of the analysis in the regions previously devoid of information storage on the said second medium; and employing the information recorded on the first storage medium for financial record keeping purposes.

13. The method of claim 12 wherein the data recorded on the first and second recording media includes lot identity and the data recorded on only the first recording media includes lot quantity.

* * * * *